United States Patent [19]

Mroynski

[11] Patent Number: 4,919,503
[45] Date of Patent: Apr. 24, 1990

[54] OPTICAL COMPONENT FOR FIBER-OPTICAL TRANSMISSION SYSTEMS

[75] Inventor: Gerd Mroynski, Paderborn, Fed. Rep. of Germany

[73] Assignee: Krone Aktiengesellschaft, Berlin, Fed. Rep. of Germany

[21] Appl. No.: 291,536

[22] Filed: Dec. 27, 1988

[30] Foreign Application Priority Data

Feb. 12, 1988 [DE] Fed. Rep. of Germany ....... 3804822

[51] Int. Cl.$^5$ .............................................. G02B 6/36
[52] U.S. Cl. ................................ 350/96.2; 350/96.15
[58] Field of Search ................. 350/96.2, 96.21, 96.15; 250/227

[56] References Cited

U.S. PATENT DOCUMENTS

| 4,410,235 | 10/1983 | Klement et al. | 350/96.2 X |
| 4,657,339 | 4/1987 | Fick | 350/96.2 |
| 4,753,507 | 6/1988 | DePaula et al. | 350/96.15 |
| 4,753,510 | 6/1988 | Sezerman | 350/96.21 |

FOREIGN PATENT DOCUMENTS

3223898A1 5/1984 Fed. Rep. of Germany .

Primary Examiner—William L. Sikes
Assistant Examiner—John Ngo
Attorney, Agent, or Firm—McGlew & Tuttle

[57] ABSTRACT

The invention relates to optical components for fiber-optic transmission system, e.g. attenuation element, filter, power divider, comprising at least two supports 50,51 for the fibers 53,54 and an adjusting member 52 movable therebetween. The invention is based on the object to provide an optical component of this kind suitable for remote control. The invention provides that the supports are formed as guide plates 50,51 and that the adjusting member is formed as adjustment plate 52 of dielectric material, that the adjustment plate 52 is movable in a guide space 57 formed between the guide plates 50, 51, and that at least one support plate 50,51 is provided with at least two electrode surfaces 55,56 building-up a dielectric field, said electrode surfaces 55, 56 being connected to a control system for voltage supply.

15 Claims, 5 Drawing Sheets

OPTICAL COMPONENT FOR FIBER-OPTICAL TRANSMISSION SYSTEMS

FIELD OF THE INVENTION

The invention relates in general to an optical component for fiber-optic transmission systems. The optical component being an attenuation element, filter, power divider or the like positioned between two supports for the fibers. And more particularly, the invention relates to an adjustable optical component, the effects of the optical component on the system being variable.

BACKGROUND OF THE INVENTION

Optical components of this kind are known in various types. These optical components include attenuation elements, filters, power dividers and the like. An adjustable optical attenuation element is known consisting of a box-type housing. The opposed side walls of the housing support couplings for the optical fibers. Optical imaging systems in the form of spherical lenses are assigned on the inner sides of the housing for light beam expansion. Within the interior, a circular disk is borne by axle journals in the side walls of the housing, the optical axis of the fiber being arranged spaced to the rotation axis of the disk. The disk carries various filter disks in the form of a filter magazine. Each of the filter disks is assigned one stop location. By turning the magazine disk, different stop locations may be selected, such that different attenuation values are adjustably selected. It is disadvantageous, here, that the adjustment of the different filters or attenuators must each be effected manually directly at the optical attenuation element. Remote actuation is not possible. Corresponding disadvantages exist for other optical components of similar construction in the form of filters, power dividers or the like.

SUMMARY AND OBJECTS OF THE INVENTION

It is the object of the invention to provide an optical component of the type discussed above, which can be remotely actuated in a simple way, such that an adjustment at the site of the optical component is no longer necessary.

According to the invention, an optical component is provided connected with two or more optical fibers. The component includes a first support and a second support defining an adjustment space. An adjusting member is positioned in the adjustment space. The adjustment member is formed of a dielectric material. Electrode surfaces are provided associated with one of the two support plates to build up at least one dielectric field. The electrode surfaces are connected to an adjustable voltage supply. The build-up of electric field causes the dielectric adjustment plate to move relative to the support plates. The arrangement may be used as an attenuation element, as a filter, a power divider or the like.

The optical component according to the invention allows a remote adjustment. This adjustment is based on the principal that applying a defined input signal by the control system, of the invention provides for a local displacement of the electrical field between the guide plates. The guide plates acting to simultaneously support or carry the optical fibers and support or carry optical imaging systems. The adjustment plate is displaced by the electrical field such that a portions of the adjustment plate having different optical properties than other portions is brought between the fibers such that different attenuation values, filter curves, power dividers or the like are possible. The optical component according to the invention can also be used as electrically controllable optical switch commutator.

Advantageously, the dielectric material may be glass or a similar material. The electrode surfaces may be electrode strips spaced in a longitudinal direction extending as high as and as low as the longitudinal measurement of the guide space. The electrode strips may be composed of conductive transparent material. Additionally, the electrode strips may be vaporized on the inner surfaces of the guide plates (by vapor deposition or the like).

Accordingly, it is an object of the invention to provide an optical component which is remotely adjustable, which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
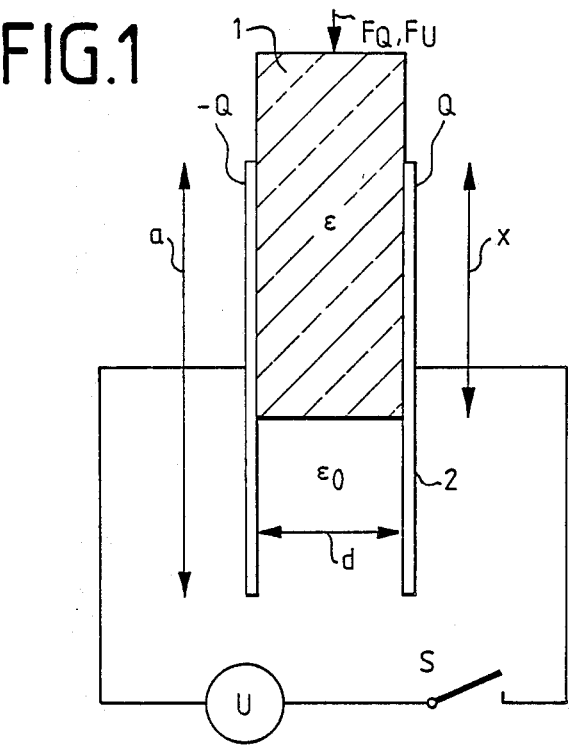
FIG. 1 is a schematic representation illustrating the physical principles of the optical component according to the invention.

The optical component according to the present invention is constructed based on the physical relationship that a movable dielectric 1 in the field of a plate condenser 2 is attracted into the latter, if, according to FIG. 1, the dielectric is first partially outside the action of the electric field (transition partially into the state of minimum energy). The force F acting on the dielectric 1 is with constant charge Q on the condenser plates 2. Accordingly, $$F_Q = \frac{1}{2} \cdot \frac{\epsilon - \epsilon_o}{[\epsilon_0 \cdot a + (\epsilon - \epsilon_0) \cdot X]^2} \cdot \frac{d}{h} Q^2$$

wherein the distance x < the distance a,
  $\epsilon$ being the dielectric constant of the ambient space,
  $\epsilon$ being the dielectric constant of the dielectric 1,
and h the dimension of the system vertically to the drawing plane (coming out of the paper). The remaining values will be introduced as per FIG. 1.

For a constant voltage U, this force is $$F_u = \frac{1}{2}(\epsilon - \epsilon_0)U^2 \frac{h}{d}$$

wherein: x < a.

On this fundamental physical principle, the optical component according to the invention is constructed such that the dielectric 1 can accurately be positioned in distinct positions with an electrical field between the condenser plates 2.

Figure 2:
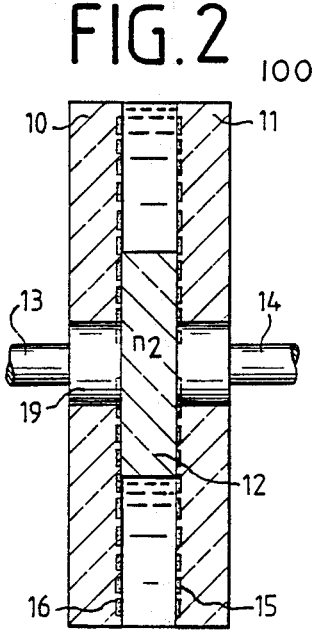
FIG. 2 is a vertical sectional view of a first embodiment of the optical component according to the invention.
Figure 3:
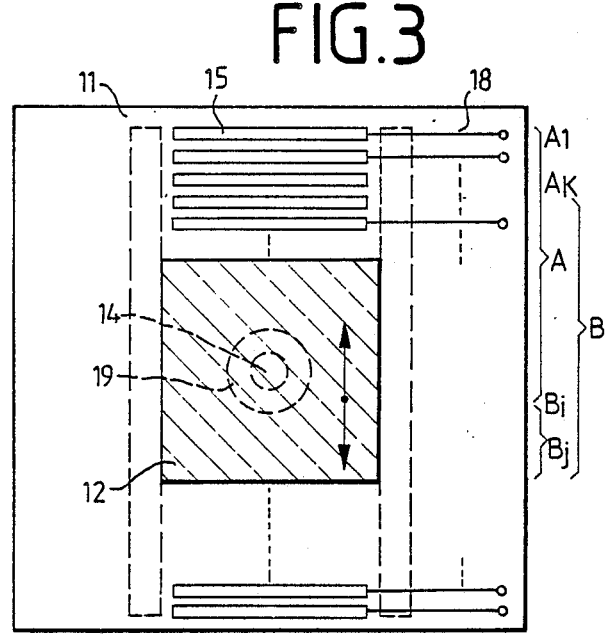
FIG. 3 is a sectional view showing a different view of the optical component according to FIG. 2.

FIGS. 2 and 3 show the first embodiment of the optical component consisting of two parallel guide plates 10, 11 in a space of distance d and with an adjustment plate 12 movable therebetween. Into the guide plates 10, 11, the optical fibers 13, 14 with their optical imaging systems 19 are inserted such that their free front faces are arranged opposed to the movable adjustment plate 12. The guide plates 10, 11 and the adjustment plate 12 consist of dielectric material, e.g. glass panes. On each inner side of the guide plates 10, 11, parallel rows of conductive electrode strips 15, 16 are disposed. They may consist of vaporized transparent material. The individual electrode strips 15, 16 of each guide plate 10, 11 are provided with terminals 18 being connected to a control system (not shown here), The control system effecting the commutation of voltage between the individual electrode strips 15, 16.

The complete optical component consisting of the guide plates 10, 11 and of the adjustment plate 12 is arranged within a hermetically sealed housing being filled with a liquid having an appropriate index.

By application of the voltage to the electrodes 15,16 or their terminals respectively, identified by the letters Bi to Bj, and by disconnection of the voltage at the electrodes 15,15 or their terminals 28, respectively, identified by the letters Ai to Ak, the electric field moves. Because of the fundamental physical principle mentioned above, the dielectric adjustment plate 12 moves to new positions and can, depending on number, distance and size of the electrodes 15,16, occupy a plurality of distinct positions. Friction is kept extremely low by adding a liquid 100 of the appropriate refractive index (e.g. substantially the same index as adjustment plate or different index depending upon the desired effect).

Application of the voltage to the electrode strips 15, 16 of the two guide plates 10, can be achieved such that the necessary commutations are effected by solid-state components being designed in chip-on-glass technology on one of the guide plates 10, 11. This is a conventional technology for LCD components. By use of such technology, only the voltages for building-up the electric field at one point and the necessary control signals have to be supplied to the solid-state components.

Power consumption is extremely low, as the energy required for moving the adjustment plate 12 to a new position is very low. Only partial capacities have to be charged. The periods of time for a new fixation of the adjustment plate 12 are determined by the inertia of the adjustment plate 12 and are of the order ms (milliseconds).

Because of the desired movement in only one straight-line coordinate, the adjustment plate 12 must be fixed either by the field itself or by a groove or spacer pieces, respectively. As it is useful to maintain the fixation even for the case of disconnected voltage, a mechanical fixation is advantageous.

The position of origin has to be effected by inertialization electrically or by mechanical means, e.g. by a traveling electric field over the complete range of movement, and then by distinct movement into a defined position of origin.

Figure 4:
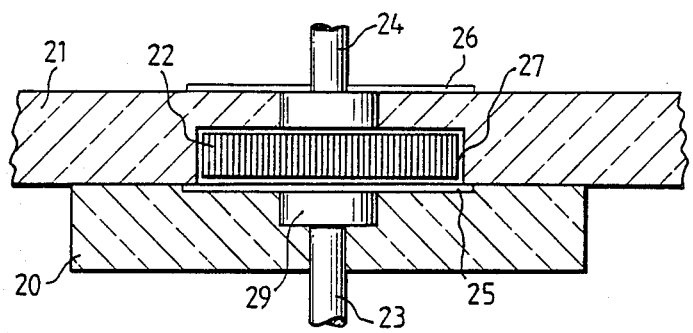
FIG. 4 is a horizontal sectional view of a second embodiment of the optical component according to the invention.

In the second embodiment according to FIG. 4, an optical component is represented, consisting of two guide plates 20, 21 and an adjustment plate 22 guided in a guide space 27 left free in the guide plate 21. The electrode strips 25,26 are arranged on the surfaces of the two guide plates 20, 21 respectively, and are positioned longitudinally (in/out of paper) in the area of the adjustment plate 22. Optical imaging systems 29 are assigned to fibers 23,24.

Figure 5:
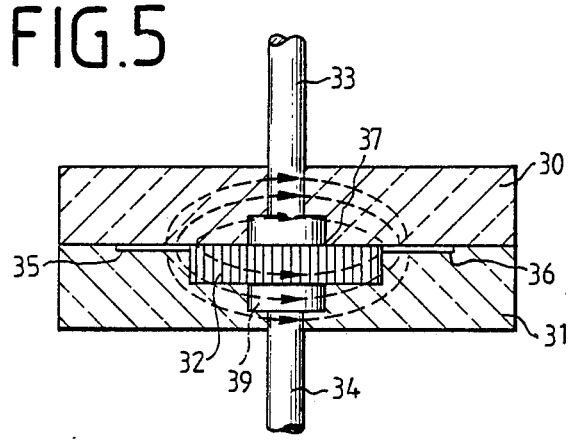
FIG. 5 is a horizontal sectional view of a third embodiment of the optical component of the invention.

In FIG. 5, the third embodiment is shown. This embodiment is particularly advantageous for simple manufacture. Here, the fibers 33, 34, respectively, are assigned to optical imaging systems 39. Only one dielectric guide plate 31 is vaporized with two rows of electrode strips 35,36 being arranged on either side of the guide space 37 extending longitudinally (into/out of paper) for the adjustment of plate 32. This leaves free the guide space 37 for the adjustment. In a similar manner, the guide plate 31 could, instead of the electrode strips 35, 36, be provided with solid-state components in chip-on-glass technology. The necessary voltage for achieving the same action of force as in the two first embodiments is, however, larger.

Figure 6:
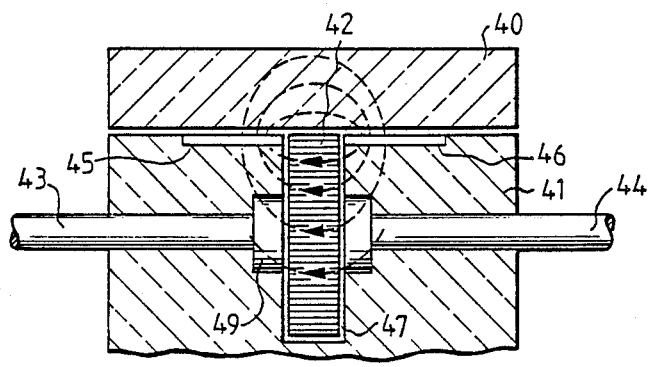
FIG. 6 is a horizontal sectional view of a fourth embodiment of the optical component according to the invention.

The fourth embodiment shown in FIG. 6 consists of a plane guide plate 40, and a second guide plate 41 provided with the guide space 47 for the adjustment plate 42. The guide plate 41 and the optical fibers 43, 44 are inserted by means of optical imaging systems 49. Two rows of electrode strips 45, 46 extend longitudinally and are disposed on the two border areas of the guide space 47 of the guide plate 41. This embodiment can be used, e.g. as an electrically adjustable optical attenuation element.

Figure 7:
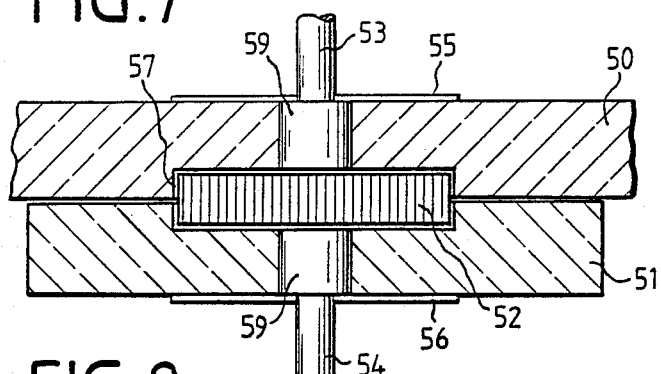
FIG. 7 is a horizontal sectional view of a fifth embodiment of the optical component according to the invention.
Figure 8:
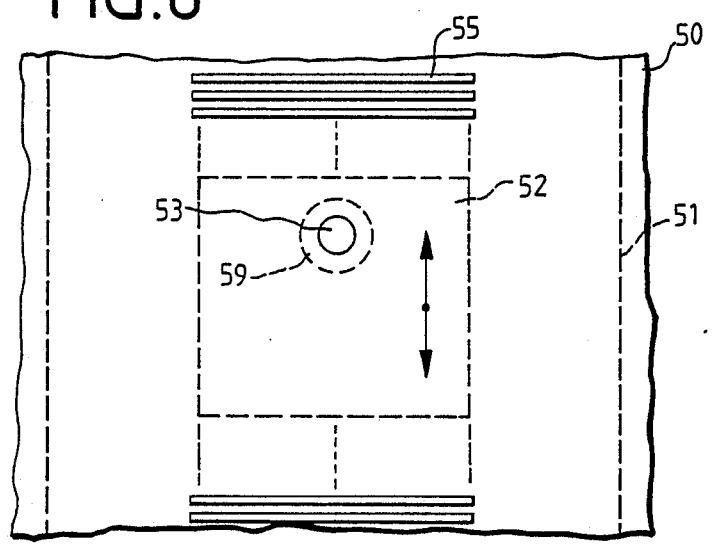
FIG. 8 is a sectional view showing a different view of the optical component of FIG. 7.

In the fifth embodiment of an optical component shown in FIGS. 7 and 8, the guide groove 57 for the adjustment plate 52 is, in contrast to the fourth embodiment, arranged uniformly in both guide plates 50, 51.

The electrode strips 55, 56 are each disposed on the outer sides of the guide plates 50, 51 in the area of the guide space 57 or of the adjustment plate 56 guided movably therein. The fibers 53, 54 terminate in optical imaging systems 59 being inserted into the guide plates 50, 51.

Figure 9:
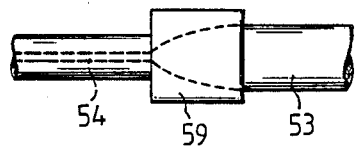
FIG. 9 is a fundamental representation of an optical imaging system.

FIG. 9 shows an optical imaging system 59 between a fiber 53 as collimated bundle and the fiber end of the other fiber 54.

In the following, special optical components are described in more detail. These optical components based on the fundamental physical principle explained above and are employed using the embodiments of FIGS. 2 to 7 for fixing the adjustment plate or for building-up the electric field, respectively. These components serve as examples only.

On optical transmission paths, the path attenuation must be adjusted to a desired value and be held constant over long periods of time. Depending on the receiving level, a telemetry signal can be transmitted to a transmitter, and an optical attenuation member can be adjusted by a control signal such that the deviation of the attenuation from the desired value remains under a predetermined threshold. For achieving these functions, e.g. the fifth embodiment according to FIG. 7 and 8 serves as an electrically adjustable optical attenuation member. The adjustment plate 52, i.e. a dielectric disk with a transmission variable in longitudinal direction is moved in the longitudinal direction between the front faces of the optical fibers 53, 54 because of the fundamental physical principle described above. Depending on the position of the adjustment plate 52, the attenuation can be adjusted in fixed steps between a maximum and a minimum value, and depending on the number of electrode strips 55, 56 arranged in the longitudinal direction and of the continuous variation of the transmission of the adjustment plate 52. Herein, the guide space 57 has a depth corresponding to the width of the adjustment plate 52.

Figure 10:
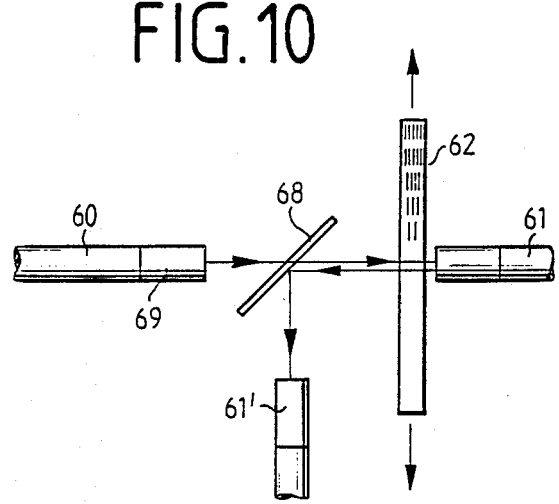
FIG. 10 is a fundamental representation of the sixth embodiment of the optical component as an electrically adjustable optical power divider.
Figure 11:
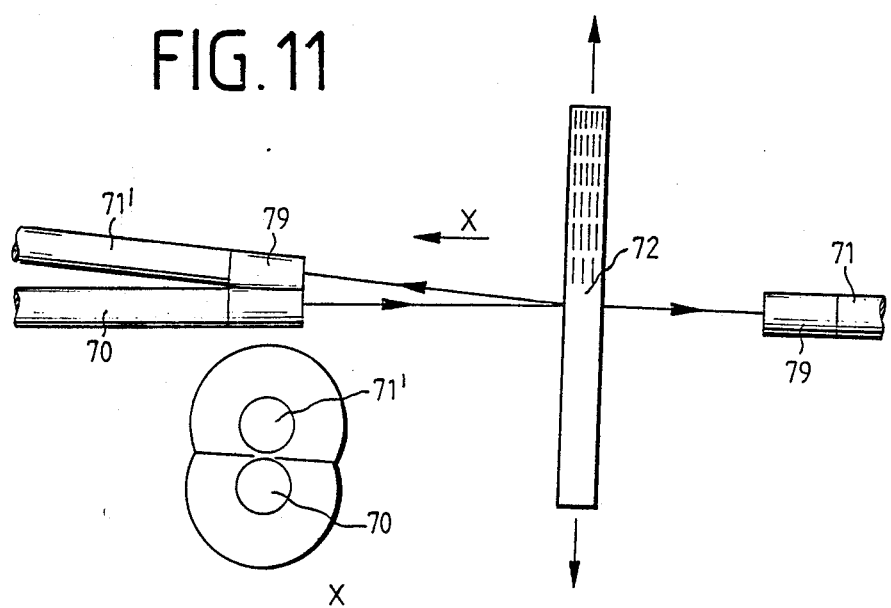
FIG. 11 is a representation of the seventh embodiment of the optical component as an electrically adjustable optical power divider.

FIGS. 10 and 11 show in fundamental representations the sixth and seventh embodiment, respectively, of the optical component as optical power divider with electrically adjustable division ratio. In communication networks with optical transmission, coupling-out of a defined portion of the optical power from the transmission path is an important function.

In the optical components of an electrically controllable power divider shown in fundamental manner in FIGS. 10 and 11, an adjustment plate 62 or 72, respectively, is provided with sectionally different interference filters which may be brought, according to the embodiments of an optical component described above, into the optical path between input fiber 60, 70 and two output fibers 61, 61, or 71, 71, respectively. By electrical control signals, the guide plate 62, 72 is brought in steps of distinct size into selected positions between guide plates carrying the electrode strips (also not shown). Hereby, filters of variable transmission or reflection, become effective in the optical base path, said filters being formed by the adjustment plates 62 or 72. The reflected optical power portion is coupled-out over a semi-transparent mirror 68 into an output fiber 61' (FIG. 10).

Figure 12:
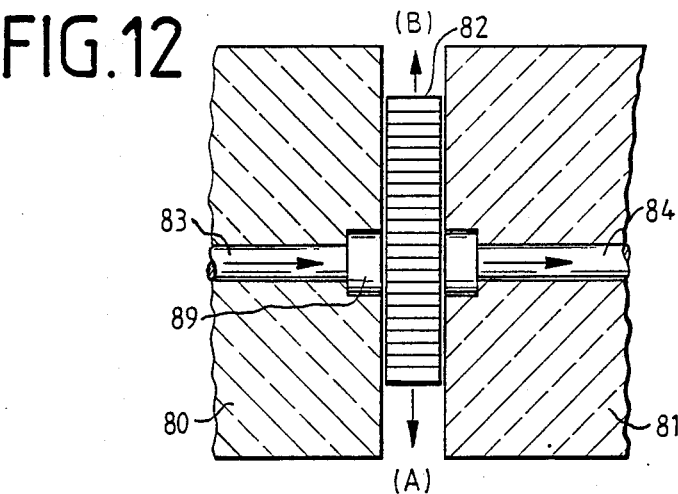
FIG. 12 is a horizontal sectional view of an eighth embodiment of the optical component as an electrically adjustable optical filter.

FIG. 12 shows the eighth embodiment of an optical component as electrically adjustable optical filter. In wavelength multiplex transmission systems, a filter must be used at the end of the path for selection of the signal having a specified wavelength. With a tunable filter, signals having different wavelengths can easily be separated. Herein, the adjustment plate 82 is the filter, the position of which is electrically controllable. The filter is movable between the guide plates 80, 81 according to the aforementioned principle between the front sides of the input fiber 83 and the output fiber 84.

Figure 13:
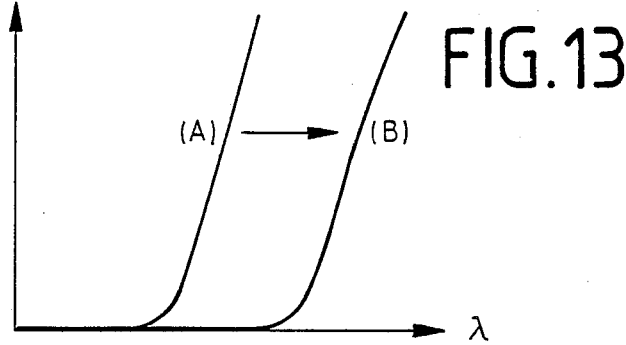
FIG. 13 is a graph representing the fundamental curve of the transmitted power of the optical filter according to FIG. 12 as a function of the wavelength and as a function of the adjustment of the adjustment plate; and, FIG. 14 is a sectional view of a ninth embodiment of the optical components according to the invention as an electrically controllable optical commutator switch.

FIG. 13 shows the fundamental curves of the coupled-out optical power for different wavelengths α and movement of the adjustment plate 82 in direction of arrow A (curve A) or in direction of arrow B (curve B).

Figure 14:
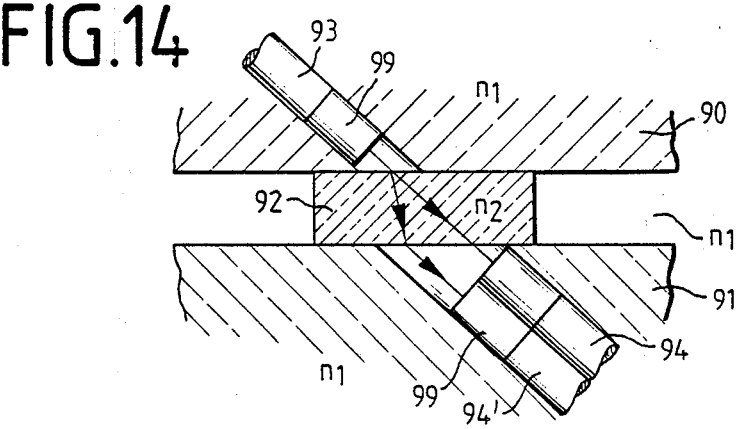

Finally, in FIG. 14, an electrically controllable optical commutator switch is shown as a ninth embodiment of the optical component. In networks with optical transmission, it is reasonable to activate replacement paths in case of a failure of individual components or networks branches, e.g. in local networks with ring-type structure. For this, optical commutator switches are necessary coupling the signal of a fiber, the input fiber 93, into one of two possible fibers 94, 94' Known switches make use, for the above purpose, of a direct mechanical or piezoelectrically controlled movement of the fiber. With the arrangement of adjustment plate 92, between two guide plates 90, 91 consisting each of dielectric material, a simple commutation can be achieved with the transparent dielectric adjustment plate 92, if its refractive index n2 is suitably selected in contrast to the refractive index n1 of all other materials. Therewith, optical matrices can be built up, too, in optical exchange networks.

Optical switches can be also formed with an arrangement identical to the fifth embodiment of the optical component shown in FIGS. 7 and 8, if the adjustment plate 52 is replaced by a non-transparent adjustment plate moved in a liquid of an appropriate index. Even with very large diameters of the fiber core, such switches can be applied as optical switches in display systems with fiber-optic light guiding and replace other less effective switches. It is useful, here, to arrange switch arrays, the dimension of which is oriented at the sizes of symbols or images.

While specific embodiments of the invention have been shown and described in detail to illustrate the application of the principles of the invention, it will be understood that the invention may be embodied otherwise without departing from such principles.

What is claimed is:

1. An optical component for two or more optical fibers, comprising: a first support guide plate; a second support guide plate cooperating with said first support guide plate to form a guide space positioned between said first and second guide plates; an adjustment plate with optical portions having different optical properties formed of dielectric material displaceably positioned in said guide space, said guide space having a length which is greater than the length of said adjustment plate; electrode means associated with at least one of said first and second support guide members, said electrode means generating at least one electric field acting to position said adjustment plate, formed of dielectric material, in said guide space whereby the build-up of an electric field causes the dielectric adjustment plate and optical portions to move relative to the support guide plate; and, terminal means connected to said electrode means for applying voltage to said electrode means for controlled positioning of said optical portions having different optical properties.

2. An optical component according to claim 1, wherein said electrode means includes a first electrode surface adjacent a first side of said dielectric material and a second electrode surface adjacent a second side of said dielectric material, each of said first and second electrode surfaces being connected to a contact of an adjustable voltage supply to vary the voltage applied across said electrode means.

3. An optical component according to claim 1, wherein: said dielectric material is formed of glass.

4. An optical component according to claim 2, wherein: the electrode surfaces are provided as rows of electrode strips spaced in a longitudinal direction.

5. An optical component according to claim 4, wherein: said electrode strips are each composed of conductive, transparent material.

6. An optical component according to claim 3, wherein: the electrode strips are vaporized on inner surfaces of the guide plates.

7. An optical component according to claim 1, wherein: one of said guide plates includes a recess portion forming the guide space.

8. An optical component according to claim 1, wherein: the electrode means includes electrode strips provided as two parallel rows on the surfaces of guide plates adjacent the guide space.

9. An optical component according to claim 1, wherein: the electrode means includes electrode strips which are provided as two parallel rows on the lateral surfaces of the guide space of a single guide plate.

10. An optical component according to claim 1, wherein: the thickness of at least one of the guide plates defines the depth of the guide space.

11. An optical component according to claim 1, wherein: the width of the guide plate defines a depth of the guide space.

12. An optical component according to claim 1, wherein: the guide space is provided by two recesses, each recess being formed in one of the two guide plates, the electrode means including electrode strips provided on the outer walls of the guide plates in the area of the adjustment plate.

13. An optical component according to claim 1, wherein: fluid is disposed in said guide space adjacent said adjustment plate.

14. An optical component according to claim 13, wherein: said fluid has an index of refraction substantially the same as said optical fibers.

15. An optical component, comprising: a first support guide plate; a second support guide plate cooperating with said first support guide plate to define a guide space between said first and second guide plates; a first optical fiber element connected to said first support guide plate on a side of said first support guide plate opposite to said second support guide plate; a second optical fiber element, connected to said second support guide plate on a side of said second support guide plate opposite said first support guide plate; an adjustment plate including a plurality of optical portions, each optical portion of said plurality of optical portions, being different from another optical portion of said plurality of optical portions, said adjustment plate being formed of dielectric material displaceably positioned in said guide space, said guide space having a length which is greater than the length of said adjustment plate; electrode means associated with at least one of said first and second support guide members, said electrode means generating a field acting to position said adjustment plate in said guide space whereby the build-up of an electric field causes the plurality of optical portions to be moved relative to said first and second fibers and such that one of said optical portions is moved into operatable alignment with said first and second optical fibers; and, terminal means connected to said electrode means for selectively applying voltage to said electrode means for selectively controlling the positioning of said optical portions and controlling the alignment of one of said optical portions with said first and second optical fibers.

* * * * *